(12) United States Patent
Mehta et al.

(10) Patent No.: US 6,931,365 B1
(45) Date of Patent: Aug. 16, 2005

(54) INDUSTRY SIMULATION ENVIRONMENT

(75) Inventors: Shailendra R. Mehta, West Lafayette, IN (US); Alok R. Chaturvedi, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 760 days.

(21) Appl. No.: 10/023,417

(22) Filed: Dec. 17, 2001

Related U.S. Application Data (60) Provisional application No. 60/256,587, filed on Dec. 18, 2000.

(51) Int. Cl.⁷ ............................................. G06F 17/10
(52) U.S. Cl. ............................... 703/1; 705/8; 718/102
(58) Field of Search ........................ 703/1, 2, 6; 705/7, 705/35; 707/10; 718/102

(56) References Cited

U.S. PATENT DOCUMENTS

| | | | | |
|---|---|---|---|---|
| 4,856,788 A | | 8/1989 | Fischel | 273/256 |
| 5,056,792 A | | 10/1991 | Helweg-Larsen et al. | 273/278 |
| 5,521,814 A | * | 5/1996 | Teran et al. | 700/266 |
| 5,984,786 A | | 11/1999 | Ehrman | 463/42 |
| 6,073,127 A | | 6/2000 | Lannert et al. | 706/45 |
| 6,078,901 A | * | 6/2000 | Ching | 705/35 |
| 6,119,101 A | | 9/2000 | Peckover | 705/26 |
| 6,405,173 B1 | * | 6/2002 | Honarvar et al. | 705/7 |
| 6,408,263 B1 | | 6/2002 | Summers | 703/6 |
| 6,484,177 B1 | * | 11/2002 | Van Huben et al. | 707/10 |
| 6,591,225 B1 | * | 7/2003 | Adelman et al. | 702/182 |

\* cited by examiner

*Primary Examiner*—Albert W. Paladini
(74) *Attorney, Agent, or Firm*—Schwegman, Lundberg, Woessner & Kluth, P.A.

(57) ABSTRACT

An apparatus and method for simulating a global industrial environment. In one embodiment, the global industrial environment models a global economy as a set of interlinked economies, models a management framework as a set of interlinked management functionalities, and models both individual and organizational behaviors through a use of a set of interlinked agents. In another embodiment, operational data independent from the interlinked economies, interlinked management functionalities, and interlinked agents is customized at run-time. In another embodiment, individuals are electronically trained in a synthetic environment for analysis and simulation of a global industrial system. In this embodiment, the environment includes a virtual execution environment, a pre-exercise briefing, one or more rounds of exercise-time activity, and a post-game analysis.

27 Claims, 8 Drawing Sheets

INDUSTRY SIMULATION ENVIRONMENT

RELATED APPLICATION

This application claims priority under 35 USC 119(e) from U.S. Provisional Application Ser. No. 60/256,587, filed Dec. 18, 2000, which application is incorporated herein by reference.

FIELD OF THE INVENTION

The present invention is related to software simulation, and more particularly to the simulation of a global industrial environment that is implemented on a distributed computing system.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever. All portions of the disclosure containing material that is subject to copyright protection was originally authored in the year 1999. The following notice applies to those portions of the disclosure containing material that is subject to copyright protection: Copyright© 1999, Purdue Research Foundation.

REFERENCE TO A COMPUTER PROGRAM LISTING APPENDIX

A Computer Program Listing Appendix on Compact Disc is included in this application. Two identical compact discs are included, labeled "COPY 1" and "COPY 2," respectively. Each compact disc conforms to the International Standards Organization (ISO) 9660 standard, and includes content that is in compliance with the American Standard Code for Information Interchange (ASCII) format. The following files included on the compact disc (filed in duplicate herewith and named "1165_005US1") are hereby incorporated by reference pursuant to 37 C.F.R 1.52(e)(5): (1) file "pb_code.txt", size 932,465 bytes, creation date Dec. 13, 2001; (2) file "pb_files.txt", size 7,741 bytes, creation date Dec. 13, 2001; (3) file "db_code.txt", size 2,355,961 bytes, creation date Dec. 13, 2001; and (4) file "db_files.txt", size 5,259 bytes, creation date Dec. 13, 2001. All material on the compact disc is also subject to copyright protection.

BACKGROUND OF THE INVENTION

Knowledge is the foundation of the new economy. Continuously expanding knowledge makes continuous learning, training, education, and consulting more important now than ever before. In the United States, an extraordinary amount of money is being spent in the area of education, and the corporate electronic learning (or e-Learning) market is expected to increase continually over the coming years.

In recent years, the concept of business war-gaming has emerged as a new source of e-Learning. Business war-gaming is the management counterpart of combat simulation, where battles are fought in marketplaces rather than battlefields, and where the main players are people and programs (manufacturers, distributors, resellers, and business customers), and jobs or organizations. Business war-gaming provides a forum for e-Learning by allowing experimentation of alternative management decision-making policies under pre-specified scenarios.

A major difference between business war-gaming and combat simulation is the technology used to build each. As opposed to the top-down, discrete event approach favored by combat simulations, business war-gaming uses bottom-up, agent-based simulation wherein software agents programmed with rules of engagement represent individuals or organizations. In this world, human players represent organizations, and the collective behavior of the individual software agents model markets and market forces.

Business war-gaming starts out today and plays into the future. It considers "what if" scenarios impacted simultaneously by technological innovations, political and regulatory changes, business and economic decisions, and the evolution of consumer preferences due to social and competitive forces. By playing through those possible alternative scenarios, participants "experience the future" of both—the strategies as well as the results. By interacting amongst themselves in these different scenarios, the participants are able to construct accurate and robust strategies.

Recent models of business war-gaming simulations have attempted to model a global economic environment. These simulations, however, do not have a fully interlinked infrastructure that can be dynamically configured.

For the reasons stated above, and for other reasons stated below which will become apparent to those skilled in the art upon reading and understanding the present specification, there is a need for a global industrial simulation environment that can model interlinked economies, interlinked management functionalities, and interlinked agents that interact in the environment. There is also a need for operational data that can be easily customized in the simulation environment, so that rules of engagement can be dynamically configured.

BRIEF DESCRIPTION OF THE DRAWINGS

In the following drawings, where the same number reflects similar function in each of the drawings.

DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Overview

According to one embodiment of the invention, there is provided a method and apparatus, including a computer-implemented method and apparatus, for creating a synthetic environment for analysis and simulation of a global industrial system. In one embodiment, the invention re-creates the business terrain with, for example, competitors, channels, suppliers, customers, workers, stocks, bonds, and currencies. The characteristics and capabilities of the various entities are based on current, accurate data. In addition, according to one embodiment, human beings control, or "play," key entities, such as competitors. By engaging with their competitors in a virtual domain, companies learn to anticipate the competitive reactions to their various moves, and using that information, choose the best strategy for itself. Companies use this embodiment of the present invention to introduce new products, try out different promotional or advertising strategies, and have an integrated view of the various possible options. Companies can also train their employees about the various nuances of their operations, and also to communicate the corporate vision. The methodology used by an embodiment of the present invention is called a LiveCase™. LiveCases are used for strategic planning, training, education, and consulting.

One embodiment of the present invention creates a distributed, interactive, and real-time environment for conducting large-scale experiments and simulations in areas where interactions among agents need to be studied. There are two types of agents that interact with each other and with other elements of the real-time environment: human (or live) agents and artificial (or virtual) agents. Human agents represent people acting as buyers, sellers, regulators, and intermediaries. Artificial agents are intelligent software agents that mimic human actors in a problem domain. The real-time environment is dynamically configurable, and is structured around the interplay of human decisions and game events that require active involvement of participants. In this fashion, this embodiment of the present invention provides a forum for e-Learning in a simulated environment by providing an environment for business war-gaming that seamlessly incorporates all aspects of managerial decision-making to provide a complete and integrated view of economies, industries, and organizations.

FEATURES OF THE INVENTION

One embodiment of the present invention provides business war-gaming simulation in a distributed computing environment that is robust and fault-tolerant. It employs networking, collaboration, data-warehousing and knowledge management technologies, and also genetic algorithms to allow re-configurable systems. One customizes the framework and rules of engagement (such as organizational behavior rules, trading rules, regulatory constraints, and foreign policy) to a user's exact needs using a high-level interface, and dynamically alter them during a LiveCase exercise.

On an economic level, an embodiment of the present invention models the global economy as a collection of interlinked economies, and each economy is governed independently. It models an arbitrarily large number of configurable and interlinked goods, services, stock, bond, labor, currency, and intellectual property markets. Production and demand processes can be arbitrarily complex and can be plugged in seamlessly. Features of the government, including the legislative, executive, and judicial branches are incorporated into the system, as well as external and environmental variables pertaining to technical change, growth, or societal shifts.

On an organizational level, an embodiment of the present invention accommodates arbitrarily large numbers of human and artificial agents that play in the same setting, and provides high-level decision making and analytical tools to every participant. Teams collaborate internally by sharing various decision-making functions across several different entities, and a highly evolved visualization and decision support system allows human players to rapidly assimilate and use large quantities of real-time information. The artificial agent technology is based on research into computational models of human behavior, and thousands of artificial agents can populate the environments and behave like fine segments of the customer, labor, or asset markets. Over time, the accumulated database of previous simulations allows leverage of the artificial agents and forecasting of behavior in critical situations.

On a management level, an embodiment of the present invention supports a full complement of management functionalities such as strategy, operations, marketing, finance, and human resources. One configures the environment to model any firm, in any industry, in any economy, at any level of detail. The environment also incorporates quantitative and qualitative relationships that are calibrated using actual data, and the environment can be updated in real-time as new data emerges either in the real world or in the simulation.

On an operational data level, an embodiment of the present invention provides data storage capabilities that are separate, and independent, from the functionalities of the run-time environment. That is, all functionalities at the economic, organizational, and management levels are separate from the data storage capabilities that support these functionalities. This provides an asynchronous environment in which customized information (including data, behaviors, scenarios, rules, and content) is used to change the operating functionality at run-time.

In summary, the software processes and interfaces of various different embodiments of the present invention replicate every essential aspect of running a modern company, including marketing, production, distribution, finance, accounting, human resources, quantitative methods, mergers and acquisitions, and strategic planning, and allow teams of human players to work with any combination of these activities.

Run-Time Simulation and the Virtual Execution Environment

Figure 1:
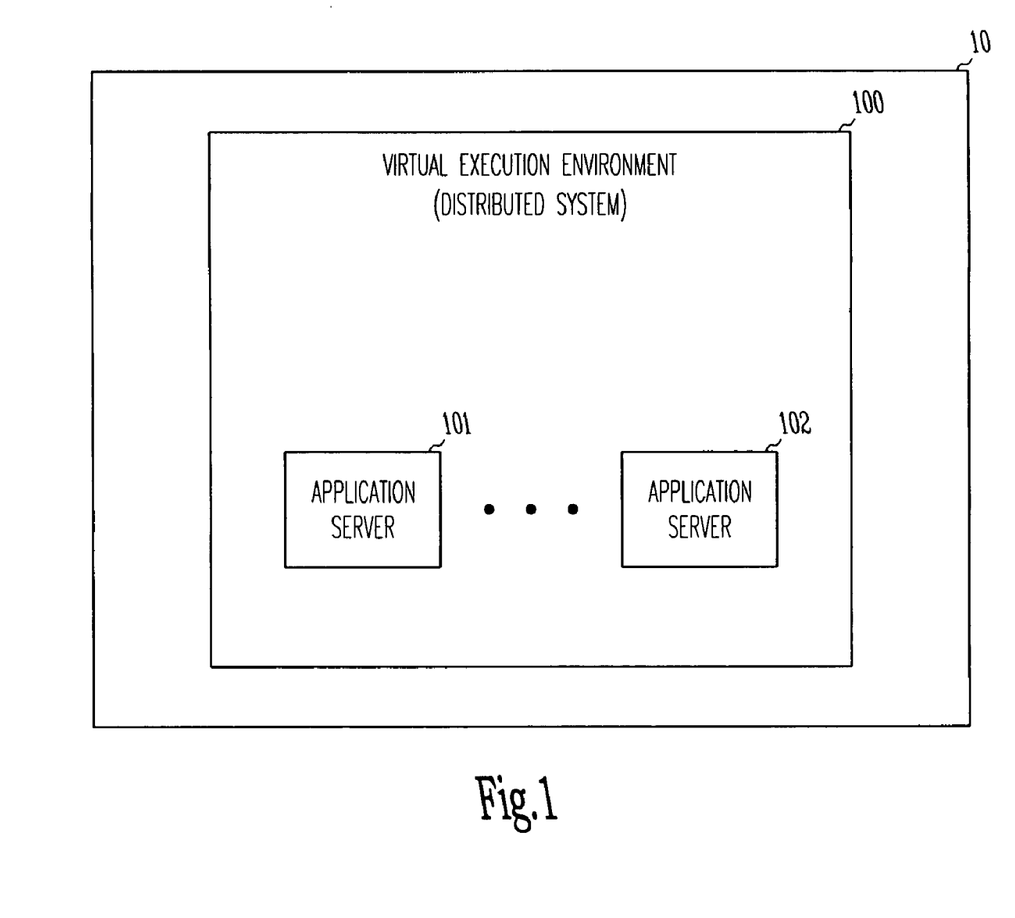
FIG. 1 is a block diagram illustrating a virtual execution environment of a computerized system in an embodiment of the present invention.

One embodiment of the present invention provides wargaming simulation in a run-time virtual execution environment (VEE). FIG. 1 is a block diagram illustrating a virtual execution environment of a computerized system in an embodiment of the present invention. The computational infrastructure allows the environment to include a series of one or more application servers to comprise a distributed system. The distributed system may include Active Server Pages, Java Server Pages, Enterprise Java Beans, Simple Java Classes, or Extensible Markup Language (XML) documents. As shown as an example in FIG. 1, computerized system 10 includes VEE 100. VEE 100 includes application servers 101 through 102. VEE 100, however, may include any number of one or more application servers in the distributed environment. In addition, there may be different classes of application servers, such as Agent Processing Servers, Economic Processing Servers, and Visualization Servers, in various different embodiments of the invention. Agent Processing Servers would be capable of running hundreds of thousands of different kinds of agents. Economic Processing Servers would be capable of representing different types of economic markets. Finally, Visualization Servers would be capable of generating advanced three-dimensional displays of data used during the simulation(s).

Figure 2:
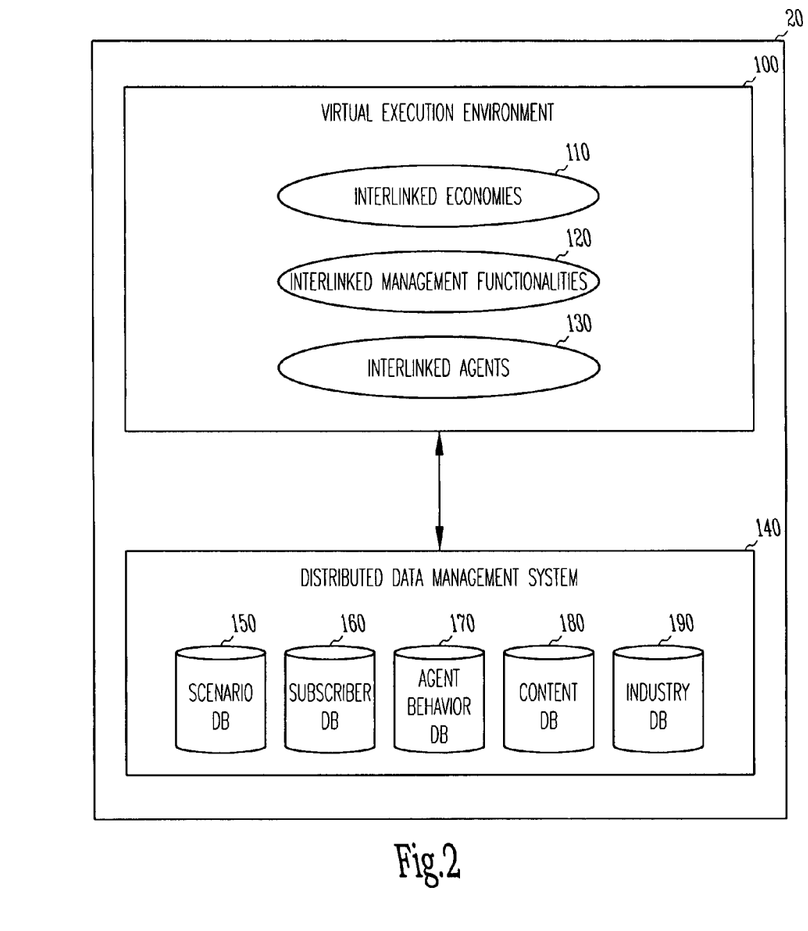
FIG. 2 is a block diagram illustrating a functional view of a virtual execution environment and a distributed data management system of a computerized system in another embodiment of the present invention.

FIG. 2 is a block diagram illustrating a functional view of a virtual execution environment and a distributed data management system of a computerized system in another embodiment of the present invention. As described already, VEE 100 includes one or more application servers 101 through 102. On a functional level, VEE includes various functionalities that model a simulated run-time environment. For example, when simulating a global industrial environment, computerized system 20 of the current embodiment includes a VEE 100 that contains functionalities for a set of interlinked economies 110, a set of interlinked management functionalities 120, and a set of interlinked agents 130. Interlinked economies 110 are used to model a global economy in the simulation environment. Interlinked management functionalities 120 are used to model a management framework in the simulation environment. Interlinked agents 130 are used to model both individual and organizational behaviors, such that these agents actively engage in the global economy, and may implement one or more of the management functionalities 120. Interlinked agents include artificial agents, and optionally included human agents as well. Interlinked agents 130 may compete with each other as part of a desired business strategy. Computerized system 20 also includes distributed data management system (DDMS) 140 that is independent from, yet operatively coupled to, VEE 100. DDMS 140 contains operational data that is used at run-time by the interlinked economies 110, interlinked management functionalities 120, and interlinked agents 130. Data flow between VEE 100 and DDMS 140 allows for dynamic configuration and customization of the simulation environment of computerized system 20, such that one or more run-time variables of the simulation environment can change over time. DDMS 140 includes one or more data stores for storing specific data that are be used by VEE 100. FIG. 2 shows a non-exclusive list of examples of some of the data stores that may be included in DDMS 140, such as scenario database (DB) 150, subscriber DB 160, agent behavior DB 170, content DB 180, and industry DB 190.

Figure 3:
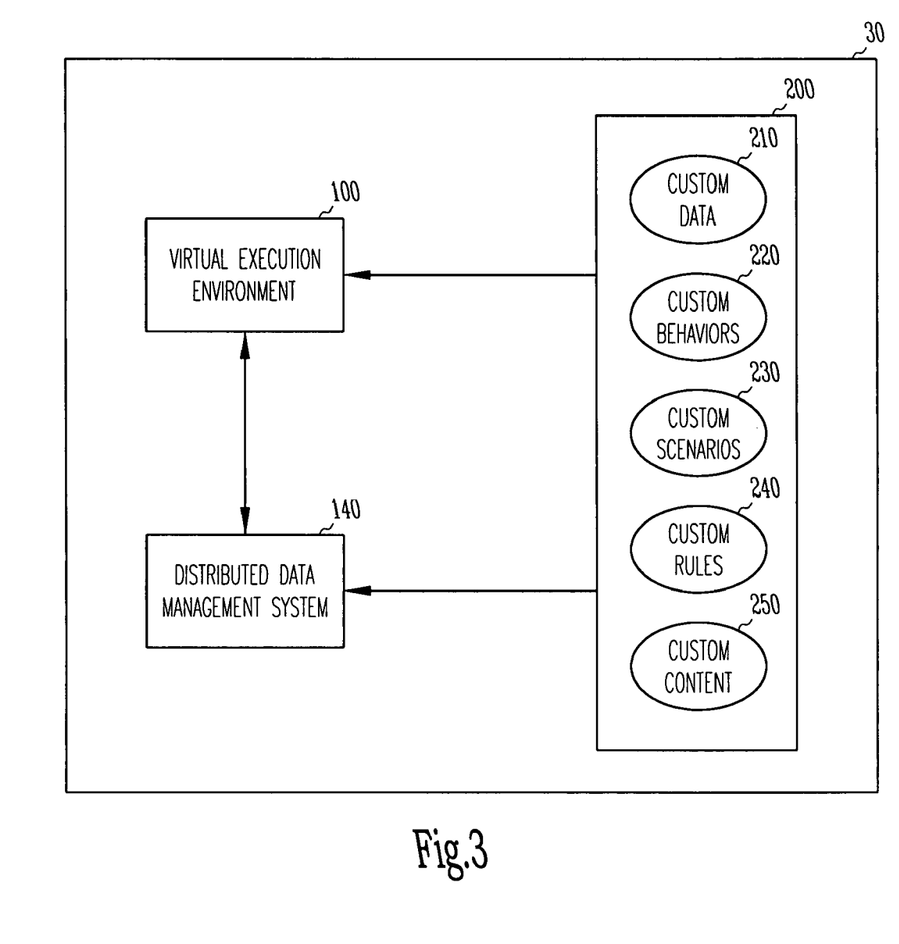
FIG. 3 is a block diagram illustrating dynamic customization of the virtual execution environment and the distributed data management system of a computerized system.

FIG. 3 is a block diagram illustrating dynamic customization of the virtual execution environment and the distributed data management system of a computerized system. In this embodiment, computerized system 30 includes VEE 100, DDMS 140, and customized data 200. VEE 100 is operatively coupled to DDMS 140. Customized data 200 can be input to either or both of VEE 100 and DDMS 140. Customized data 200 that is input into VEE 100 dynamically configures the run-time environment of VEE 100. Customized data 200 that is input into DDMS 140 dynamically populates the data stores of DDMS 140 with specific customized data that is used to dynamically change or configure the operation of VEE 100 during simulation run time. Customized data 200 is independent of both VEE 100 and DDMS 140 to allow maximum run-time flexibility. FIG. 3 shows a non-exclusive list of the types of custom information that can be included within customized data 200, such as custom data 210, custom behaviors 220, custom scenarios 230, custom rules 240, and custom content 250.

Figure 4:
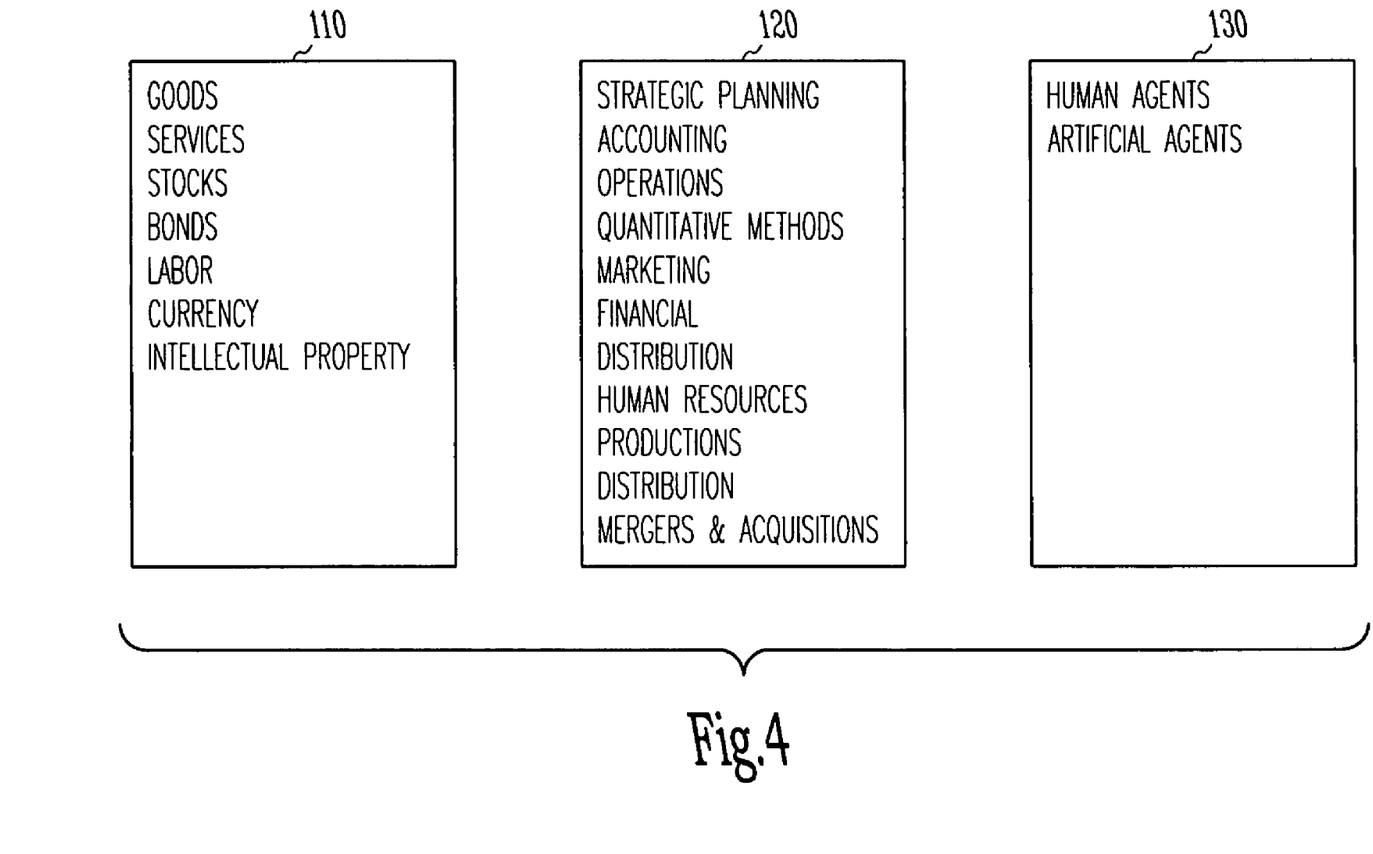
FIG. 4 is a block diagram illustrating embodiments of the interlinked economies, management functionalities, and agents of the present invention.

FIG. 4 is a block diagram illustrating embodiments of the interlinked economies, management functionalities, and agents of the present invention. As described above, VEE 100 includes functionalities for a set of interlinked economies 110, a set of interlinked management functionalities 120, and a set of interlinked agents 130. Interlinked economies 110 are used to model a global economy in the simulation environment. FIG. 4 shows a non-exclusive list of some of the markets that can be included within interlinked economies 110, such as goods, services, stocks, bonds, labor, currency, and intellectual property. Interlinked management functionalities 120 are used to model a management framework in the simulation environment. FIG. 4 shows a non-exclusive list of some of the functionalities that can be included within interlinked management functionalities 120, such as strategic planning, accounting, operations, quantitative methods, marketing, financial, distribution, human resources, productions, distribution, and mergers/acquisitions. Interlinked agents 130 are used to model both individual and organizational behaviors, such that these agents actively engage in the global economy, and may implement one or more of the management functionalities 120. FIG. 4 shows that the interlinked agents include both human and artificial agents that act in a run-time environment in one embodiment of the invention. Artificial agents include both individual and organizational agents. Human agents include buyer, seller, regulator, intermediary, and organizational agents. In another alternative embodiment, interlinked agents 130 includes only artificial agents.

Figure 5:
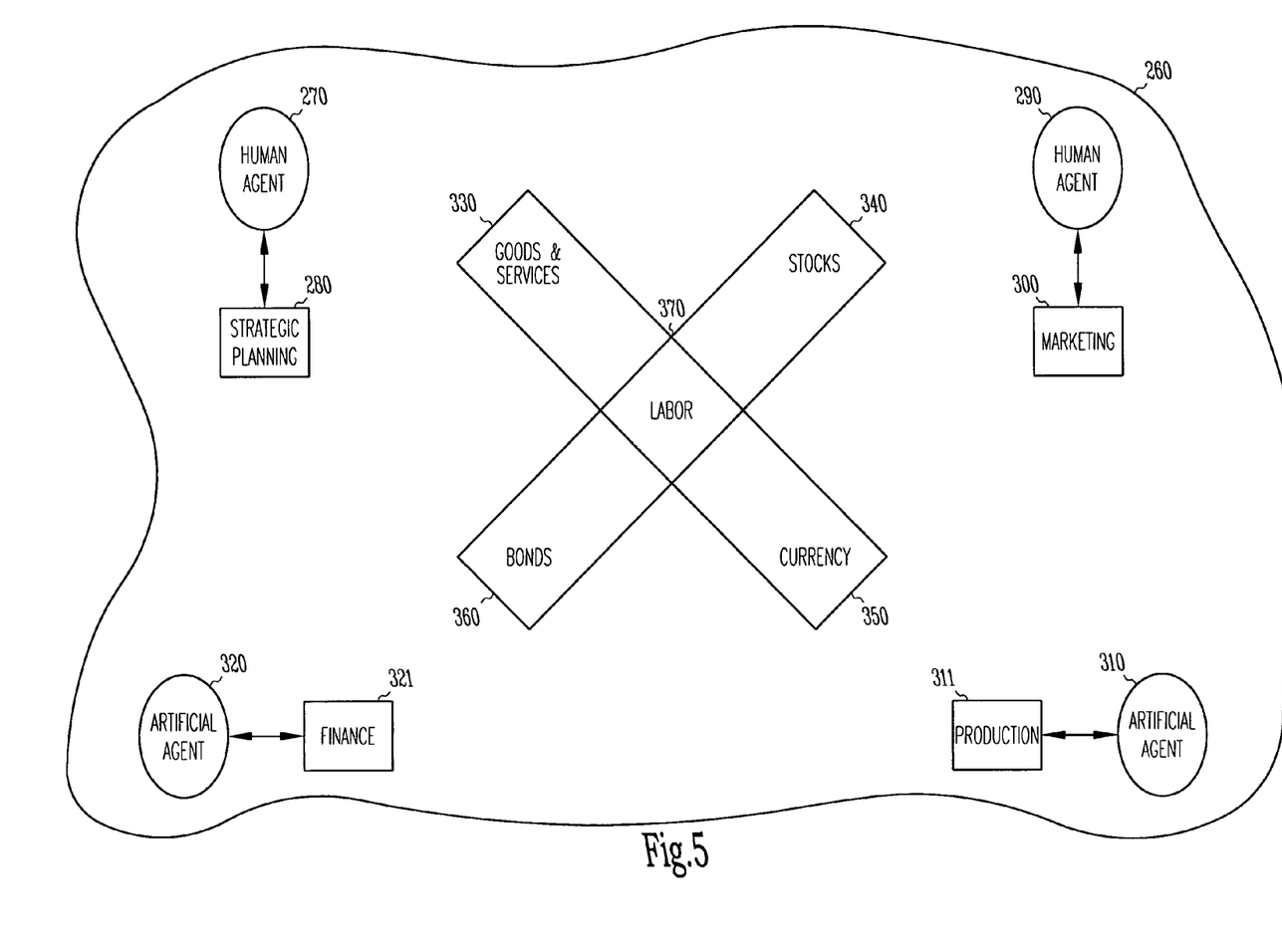
FIG. 5 is high-level view illustrating an example of a global industrial environment having interlinked economy markets, management functionalities, and agents.

FIG. 5 is high-level view illustrating an example of a global industrial environment having interlinked economy markets, management functionalities, and agents. FIG. 5 shows only an example of a run-time scenario that operates within the environment. Global industrial environment 260 operates within an embodiment of the computerized system of the present invention. Global industrial environment 260 includes interlinked economies that represent various markets. The markets include goods and services 330, stocks 340, currency 350, bonds 360, and labor 370. Artificial agents 310 and 320 may represent individuals or corporations within the global industrial environment 260 that are programmed with intelligence and rules of engagement (described in more detail below). Artificial agents 310 and 320 interact with each other, and engage in activity within the global economy. These agents also may interact and compete with human agents 270 and 290. Human agents 270 and 290 represent human players who participate in the war-gaming simulation, and these agents may compete with each other, or with artificial agents 310 and 320. Each of the human and artificial agents may engage in the global economy, and may transact within any of the markets listed 330–370. In addition, each of the agents may implement one or more management functionalities as part of an overall management framework. FIG. 5 shows human agent 270 implementing a strategic planning management functionality 280, human agent 290 implementing a marketing management functionality 300, artificial agent 310 implementing a production management functionality 311, and artificial agent 320 implementing a finance management functionality 321.

Figure 6:
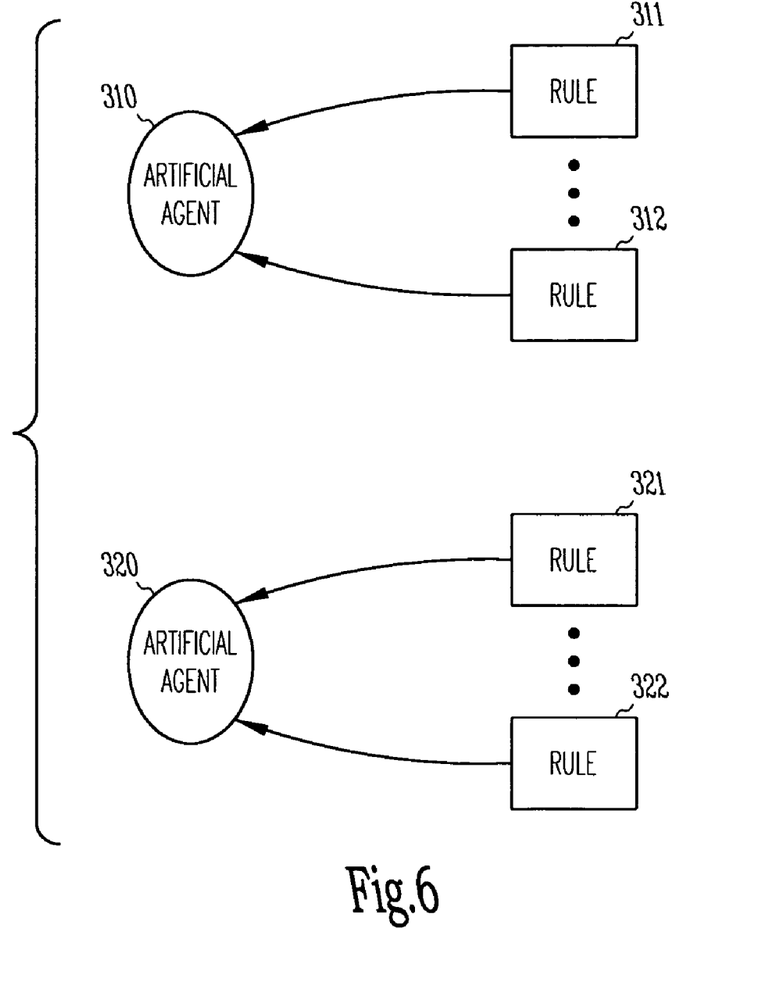
FIG. 6 is a block diagram illustrating rules of engagement that are used to program artificial agents.

FIG. 6 is a block diagram illustrating rules of engagement that are used to program artificial agents. Artificial agents are intelligent agents used to represent economic realities of electronic markets are hierarchies in a decentralized manner. Artificial agents are adaptive and behave like human agents in a narrow domain. In their respective domains, each agent has a well-defined set of responsibilities and authorities so that it executes its tasks effectively. Examples of artificial agents are economic agents (e.g. consumer, producer, regulator), political agents (government, special interest), etc. An artificial agent is equipped with reasoning, action, and communication skills required for performing their respective tasks. An artificial agent is characterized by the knowledge it possesses in its knowledge base, wherein the knowledge base includes communications knowledge, messaging knowledge, operational knowledge, functional knowledge, and knowledge about its authority. Communications knowledge facilitates message passing among artificial agents. Messaging knowledge helps an agent decide what is the appropriate message type, what information to send in the message, how to respond to a message, how long to wait for a response, how to decipher a received message, when to ignore a message, and when to forward a message. Operational knowledge consists of knowledge needed to perform various tasks and information about the current status of the tasks being processed and those yet to be processed. Functional knowledge represents the specific goals an agent meets within different decision-making situations, wherein the goals are typically concerned with things such as quality, price, quantity, economic value (costs, profits, etc.), and utility values. Knowledge about authority of an artificial agent is the specific rights (e.g., constraints it can relax) it has in making decisions regarding its functions. The knowledge base thus includes rules of engagement for an agent within the simulation environment. Artificial agents 310 and 320 are shown as examples in FIG. 6. The knowledge base of artificial agent 310 includes knowledge based from a set of one or more rules. As shown in FIG. 6, rules 311 through 312 provide intelligence to agent 310, and includes knowledge that will populate the agent's knowledge base. Agent 310 obtains its intelligence from rules 311 through 312. Similarly, rules 321 through 322 provide intelligence to agent 320.

Software Interface Classes

Figure 7:
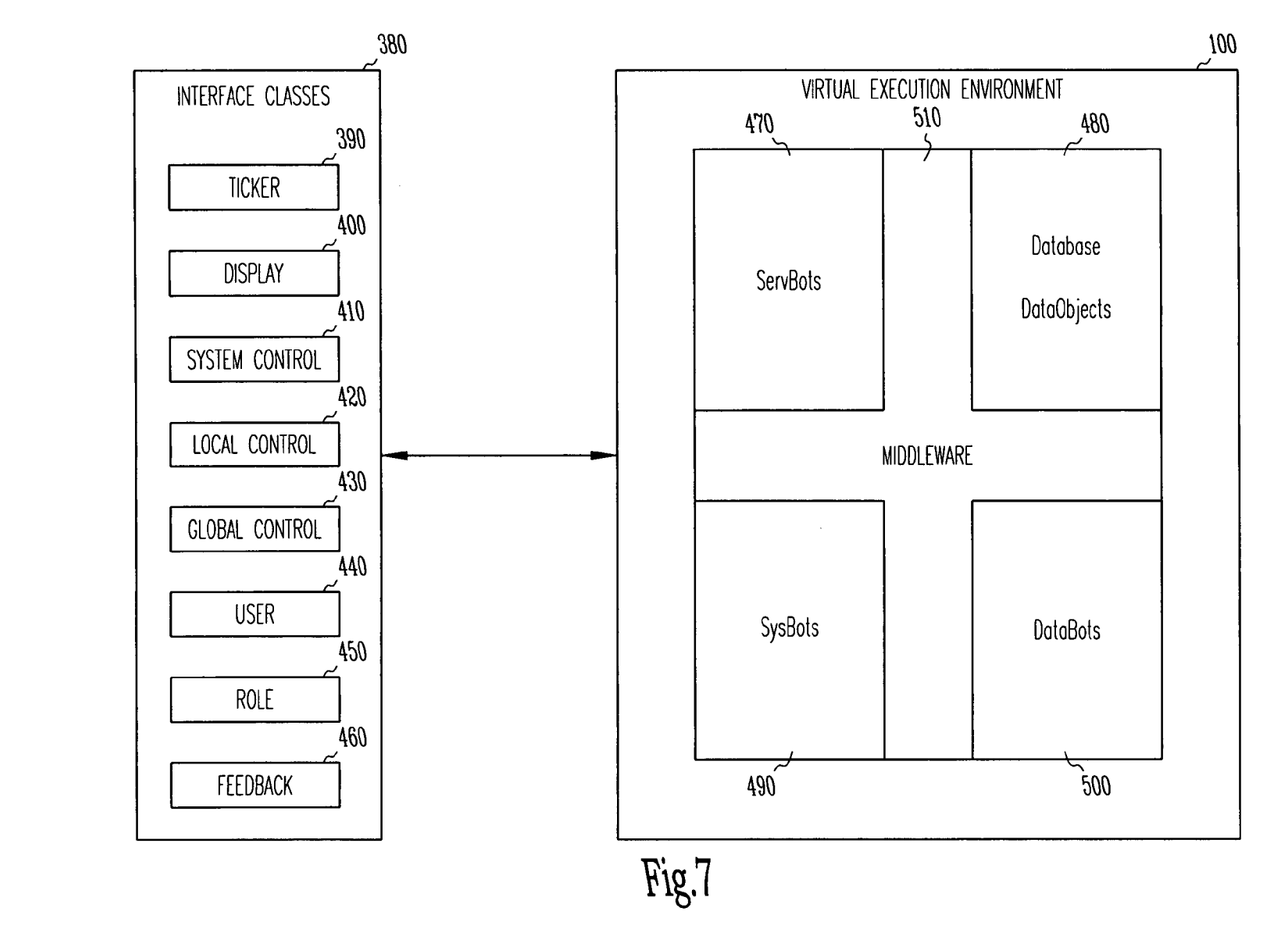
FIG. 7 is a block diagram illustrating a software architecture of the virtual execution environment and a series of interface classes that are implemented in an embodiment of the present invention.

The software environment is highly re-configurable. FIG. 7 is a block diagram illustrating an example of a software architecture of the virtual execution environment and a series of interface classes that are implemented in an embodiment of the present invention. On the VEE for this embodiment, there are three classes of active software objects called "bots." VEE 100 shows ServBots 470, SysBots 490, and DataBots 500. ServBots 470 are autonomous agents that perform the business tasks. Examples of ServBots are BuyBot (agents that perform buying functions), SellBot, AcquireBot, ProduceBot, etc. ServBots 470 also function as an Application Programming Interface (API) for third-party game development. SysBots 490 are autonomous agents that perform system-level. Each ServBot includes SysBots that are individually replaceable. Inititate SysBots are the sensors for a given ServBot. When certain conditions are met, they trigger action from the ServBot. Search SysBots make the ServBots intelligent. With a Search SysBot, each ServBot can autonomously search the state space for an appropriate action in its specified domain. Evaluate SysBots enable the ServBot to evaluate different alternatives and select the most appropriate course of action. Execute SysBots execute the course of action need by the ServBot. Communicate SysBots have the knowledge of the work flow and the chain of command. After the action is taken, these bots communicate the appropriate message/information to the appropriate parties. Update SysBots update the relevant information/data at the appropriate times. These bots are critical for the system performance. Terminate SysBots are quality assurance bots that make sure that the tasks are completed satisfactorily.

The example embodiment of FIG. 7 also shows DataBots 500 that are developed to interface with enterprise systems so that firms can seamlessly integrate with the VEE to explore new strategy spaces or as a wind tunnel of corporate strategies. These DataBots 500 interact with the Data Base and Data Objects 480 for their data needs using Middleware 510. VEE 100 interacts with, and is operatively coupled to, re-configurable interface classes 380. Interface classes 380 includes eight different types of classes. These classes are Ticker 390, Display 400, System Control 410, Local Control 420, Global Control 430, User 440, Role 450, and Feedback 460. ServBots 470, SysBots 490, and DataBots 500 are dynamically assembled for each of these interface classes based on a participant's profiles, or on demand. This architecture provides the necessary flexibility to adapt the simulation environment to a wide variety of problem domains.

Game Play

The simulations can run anywhere from a few hours, to days, to a continuously running global game over the Internet. Shorter versions of the game consist of three distinct steps: pre-exercise briefing, exercise-time activity, and post-exercise analysis. These simulations are used for electronically training individuals in a synthetic environment for analysis and simulation of a global industrial system.

Figure 8:
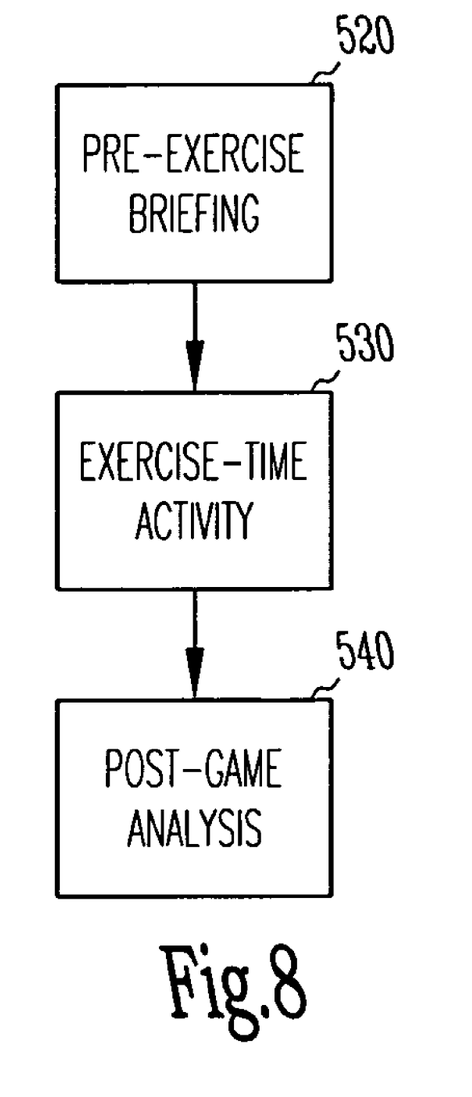
FIG. 8 is a flow diagram illustrating game simulation training steps in an embodiment of the present invention.

FIG. 8 is a flow diagram illustrating game simulation training steps in an embodiment of the present invention. During pre-exercise briefing 520, the participants are assigned to different groups representing their own presence in the market place(s) and other competitors in the industry (locally and/or globally). Each group is briefed about the competitive landscape of the industry, product lines, cost and demand functions, published strategies of firms, and the rules of engagement. After the briefing, the participants undergo a few rounds of training.

During the exercise-time activity 530, several rounds are played. Each round may represent a month, a quarter, or a year. The scenarios can be changed dynamically within an exercise. For example, depending upon the level of customization, regulations can be changed to reflect different options being considered by various local, national, and international regulatory authorities; the pace of technical progress can be altered; economic growth and the rate environment factors can be changed; staffing and service levels can be changed; and new products and competitors are introduced into various markets. Participants would have to respond to the changes in the environment by altering their current strategies or by devising new ones. The underlying market captures every move a player makes and generates the prices, quantities, market shares, revenue to expense ratios, and returns on investment and equity, exactly as they are determined in real life. The outcomes in these scenarios are available for post-game analysis.

The post-game analysis 540 is the most crucial and fun part of the simulation and experiential learning methodology since a significant part of the learning happens there. It is a team effort conducted using group dynamics and techniques. Senior executives with substantial business experience, the players, the consultants, the business professors and the students, and people with extensive experience will conduct these sessions. The strategies devised and tested, the idiosyncrasies of the markets and other lessons learned, are then formalized.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method for simulating a global industrial environment, the method comprising:
    modeling a global economy as a set of interlinked economies;
    modeling a management framework as a set of interlinked management functionalities; and
    modeling both individual and organizational behaviors through a use of a set of interlinked agents, wherein the set of interlinked agents actively transact in the global economy and implement one or more of the set of interlinked management functionalities, and wherein the global industrial environment is dynamically configurable.

2. The method of claim 1, and further comprising customizing operational data in a distributed data management system for the set of interlinked economies, the set of interlinked management functionalities, and the set of interlinked agents, so that one or more variables in the global industrial environment changes over time.

3. The method of claim 1, wherein the set of interlinked economies includes markets for goods, services, stocks, bonds, labor, currency, and intellectual property.

4. The method of claim 1, wherein the set of interlinked management functionalities includes strategic planning, operations, production, distribution, accounting, quantitative methods, mergers and acquisitions, marketing, finance, and human resource functionalities.

5. A method for war-gaming a global economy implemented on a distributed computing environment, the method comprising:
    forming a virtual global economy as a set of interlinked economies and political entities, wherein each economy is modeled based on a set of markets selected from a group consisting of goods, services, stocks, bonds, labor, currency, and intellectual property;
    representing a firm based on a set of management functionalities selected from a group consisting of strategic planning, operations, production, distribution, accounting, quantitative methods, mergers and acquisitions, marketing, finance, and human resources; and
    engaging by a player as a firm against at least another player as another firm, which is a competitor of the firm, so as to induce a desired business strategy.

6. The method of claim 1, wherein the distributed computing environment includes one or more elements each of which is selected from a group consisting of Active Server Pages, Java Server Pages, Enterprise Java Beans, Simple Java Classes, and Extensible Markup Language (XML) documents.

7. A method for electronically training individuals in a synthetic environment for analysis and simulation of a global industrial system, the method comprising:
    creating a virtual execution environment on a distributed computing system, wherein the virtual execution environment is dynamically configurable;
    conducting a pre-exercise briefing;
    simulating a global economy having one or more markets;
    operating a human agent in the virtual execution environment;
    operating a plurality of artificial agents in the virtual execution environment, wherein the plurality of artificial agents represent intelligent software agents that each has a knowledge base programmed with rules of engagement;
    simulating one or more management functionalities;
    conducting one or more rounds of exercise-time activity; and
    conducting a post-game analysis.

8. The method of claim 7, wherein the method is performed in an order recited in claim 7.

9. The method of claim 7, wherein the human agent is selected from a group consisting of a buyer agent, a seller agent, a regulator agent, am intermediary agent, and an organizational agent.

10. The method of claim 7, wherein the plurality of artificial agents are each selected from a group consisting of an individual agent and an organizational agent.

11. The method of claim 7, wherein the knowledge base of each of the plurality of artificial agents is selected from a group consisting of communications knowledge, messaging knowledge, operational knowledge, functional knowledge, and knowledge about authority.

12. The method of claim 7, wherein the one or more markets of the global economy are each selected from a group consisting of goods, services, stocks, bonds, labor, currency, and intellectual property.

13. The method of claim 7, wherein the one or more management functionalities are each selected from a group consisting of strategic planning, operations, production, distribution, accounting, quantitative methods, mergers and acquisitions, marketing, finance, and human resources.

14. The method of claim 7, and further comprising populating one or more independent data stores with customized data.

15. The method of claim 14, wherein the customized data is selected from a group consisting of customized data, customized behaviors, customized scenarios, customized rules, and customized content.

16. The method of claim 7, and further comprising operating one or more additional human agents in the virtual execution environment.

17. An industry simulation environment configured on a distributed computing system, the industry simulation environment comprising:
    means for creating a virtual execution environment;
    means for modeling one or more interlinked economies;

means for modeling one or more interlinked management functionalities;

means for modeling a plurality of agents; and means for dynamically customizing run-time data in the industry simulation environment.

18. A computerized-method for running a business simulation game in a distributed computing system, the computerized-method comprising:

establishing a distributed virtual execution environment that includes one or more application servers;

establishing a distributed data management system that is operatively coupled to the distributed virtual execution environment, wherein the distributed data management system includes one or more data stores;

electronically simulating a set of interlinked economies on the distributed virtual execution environment;

electronically simulating a set of management functionalities on the distributed virtual execution environment;

electronically engaging a plurality of artificial agents within the distributed virtual execution environment; and electronically customizing the one or more data stores of the distributed data management system.

19. The computerized-method of claim 18, and further comprising electronically engaging one or more live agents within the distributed virtual execution environment.

20. The computerized-method of claim 18, wherein the computerized-method is performed in an order recited in claim 18.

21. The computerized-method of claim 18, wherein each of the one or more data stores of the distributed data management system is selected from a group consisting of a scenario data store, a subscriber data store, an agent behavior data store, a content data store, and an industry data store.

22. A computer-readable medium having instructions stored thereon for simulating a global industrial environment that is implemented on a distributed computing environment, wherein the instructions perform a computerized-method comprising:

modeling a global economy as a set of interlinked economies;

modeling a management framework as a set of interlinked management functionalities;

modeling both individual and organizational behaviors through a use of a set of interlinked agents, wherein the agents actively engage in the global economy and implement one or more management functionalities; and customizing operational data for the set of interlinked economies, the set of interlinked management functionalities, and the set of interlinked agents, so that one or more variables in the global industrial environment changes over time.

23. A computerized-system comprising:

a virtual execution environment having one or more application servers in a distributed computing system, such that the one or more application servers process information during a simulation of a global industrial environment to provide functionality for a plurality of interlinked economies, a plurality of interlinked management functionalities, and a plurality of interlinked agents;

one or more independent data stores operatively coupled to the virtual execution environment; and one or more customized data elements that populate both the virtual execution environment and the one or more independent data stores during the simulation of the global industrial environment.

24. The computerized-system of claim 23, wherein the one or more customized data elements are each selected from a group consisting of custom data, custom behaviors, custom scenarios, custom rules, and custom content.

25. A method for managing a strategic plan in a synthetic environment for analysis and simulation of a global industrial system, the method comprising:

creating a virtual execution environment, wherein the virtual execution environment is dynamically configurable;

simulating a global economy having one or more markets;

simulating a strategic-planning management functionality;

maintaining one or more data stores, wherein the one or more data stores are independent from the virtual execution environment;

engaging one or more human agents in the virtual execution environment, wherein the one or more human agents implement the strategic-planning management functionality; and engaging a plurality of artificial agents in the virtual execution environment, wherein the plurality of artificial agents represent intelligent software agents that each has a knowledge base programmed with rules of engagement.

26. The method of claim 25, wherein the method is performed in an order recited in claim 25.

27. The method of claim 25, and further comprising testing an execution of the strategic-planning management functionality.

* * * * *